UNITED STATES PATENT OFFICE.

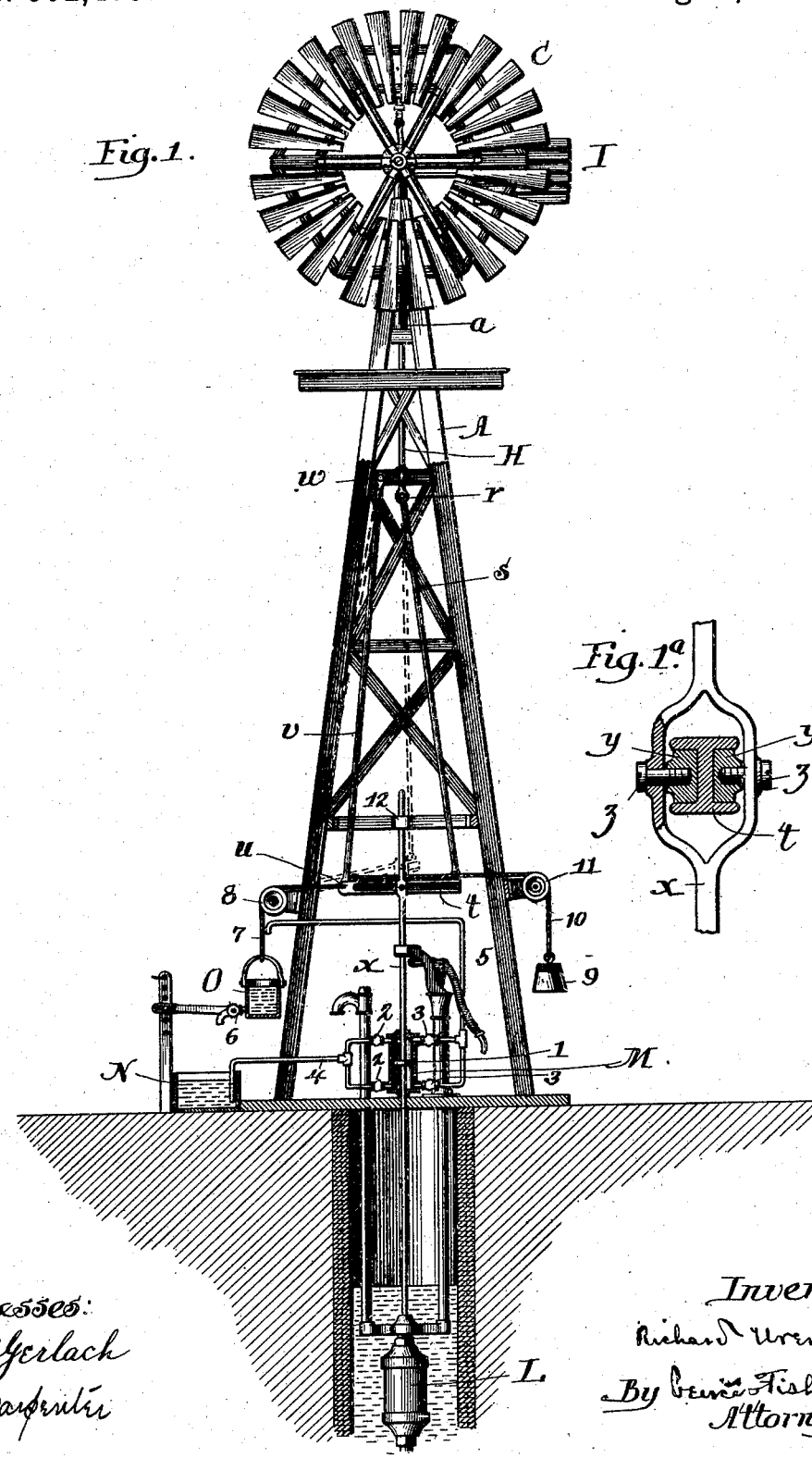

RICHARD UREN, OF RIPLEY, MICHIGAN.

WINDMILL.

SPECIFICATION forming part of Letters Patent No. 502,479, dated August 1, 1893.

Application filed July 15, 1892. Serial No. 440,120. (No model.)

*To all whom it may concern:*

Be it known that I, RICHARD UREN, of Ripley, in the county of Houghton, State of Michigan, have invented certain new and useful Improvements in Windmills, of which the following is hereby declared to be a full, clear, and exact description, sufficient to enable others skilled in the art to which such invention appertains to make and use the same.

The invention designs to vary the duty upon the revolving wheel of a wind-mill, so that the load can be automatically adjusted in keeping with the speed of the wind. In a gale the wheel tends to revolve faster and is capable of performing more work than in a moderate wind or in a light breeze, and the purpose is to take advantage of these changes in speed by loading the wheel more heavily as its power (*i. e.*, rapidity of rotation) increases and vice versa, the result being to approximate unto a substantially uniform rate of revolution for the wheel, and thus to secure its steady even play (within limits) irrespective of the character of the wind. Ordinarily, if the duty assigned to the wheel be fixed with reference to its rotation in a gale, then under influence of a gentle breeze the wheel will not clear the "dead points" and in consequence its work remain at a stand-still. But were the duty automatically adjusted so that when the wind is light the load is light, and heavy when a stiff breeze prevails, the wheel could be made to work regularly, describing its revolution, at all stages of the wind short of a high gale, which latter of course must compel the wheel to go out of action more or less completely by automatic shift, as well understood. The aim is to utilize the power according to the extent thereof, employing the same (whether much or little) in the performance of the mill work; an increased duty being ratably assigned in exact keeping with the increase in the power itself.

The exact nature of the improvements will appear from the description following and be distinctly pointed out by claims at the conclusion thereof.

Referring to the accompanying drawings wherein like parts are denoted by like designation throughout: Figure 1 is a view in elevation (parts in section) of a solid wheel windmill with pump actuated thereby; showing one form of the intermediate automatically-shifting link-connector; Fig. 1$^a$ a cross-section of the link connector at the junction with the piston-rod.

In general structure, the wind-mill may be of any of the usual types and as here shown consists of the familiar tower A having a turntable mount $a$ at its top upon which is set the solid vane revolving wheel C. The wheel has tail-vane, and side-vane I as in ordinary practice while the wrist-pin on its axle joins by pitman $b$ to the upper end of the pump-bar H to reciprocate said bar. Near its lower end the pump-bar H is shown extending through a suitable guide and at its terminal $r$ is pivotally joined to the upright rod $s$ constituting a part of the shifting link connector. The opposite end of the rod $s$ is fastened rigidly to the cross bar $t$ secured pivotally as at $u$ to the lower terminal of a link $v$ pivotally mounted overhead, as at $w$, to a suitable part of the tower frame. The link $v$ and rod $s$ serve to suspend the cross bar $t$ so that said bar is free to shift to and fro within limits from the pivots $r$ $w$ as points of support. In its upper portion, the piston rod $x$ for the pump is bifurcated as shown (Fig. 1$^a$) to receive the cross bar $t$ within the forks thereof. Sliding blocks $y$ mounted in trued ways upon the cross bar $t$ so as to slide freely along the same are pivotally held by the pins $z$ from the forks of the piston rod. At its lower end the piston rod $x$ carries the usual piston for the pump L, but in addition thereto carries also the piston head $l$ of a supplemental pump M here shown in position above the main pump.

The supplemental pump M is conveniently of the double-acting type having check inlet valves 2 and check outlet valves 3 to govern the flow of liquid through the pump cylinder. The pipes which carry the check inlet valves 2 are conveniently joined together and lead thence by common tube 4 to a supply reservoir N, while the check outlet pipes lead by common tube 5 to a discharge position over the tank O. Tank O has an outlet cock 6 which can be automatically adjusted if desired by the rise and fall of the tank O; said cock 6 delivering liquid from the tank to the reservoir N beneath. The tank O is suspended by a cable 7 over sheave 8 from one end of the cross bar $t$ which bar at its opposite end carries the counter-weight 9 by means of cable 10 passing over sheave 11. The upper terminal of the piston rod $x$ plays through a straight guide as at 12, upon the tower frame, and is thus insured a straight rectilineal play during reciprocation. Such movement of the piston rod is effected through the pump bar H and the link connector which is arranged between them.

The play of the piston rod $x$ not only starts the main pump L but also causes the supplemental pump M to act, water being drawn thereby from the reservoir N through the pump M and discharged over-head into the balance tank O. If the discharge into the tank O is greater than the ventage through the cock 6, then the weight of said tank and its contents becomes gradually heavier, whereby the cross bar $t$ is drawn laterally past the fork and block mount of the piston rod $x$ and against the resistance of the counterweight 9. Since the cross bar $t$ moves radially about its pivot $u$ from the suspension link $v$ as a center, it is plain that as the shift occurs, the fork and block connection of the piston rod $x$ is transferred to a greater distance from the pivot $u$ and thus describes a longer path under the reciprocating play of the rod $s$ and the pump bar H. In other words, the stroke of the piston rod $x$ has been lengthened, thereby increasing the duty at the supplemental pump M and the main pump L as well. The tank O becomes more and more over-weighted by reason of the increase in feed through the pipe 5 until finally the sliding cross bar $t$ reaches the limit of its play and the stroke of the pump rod $x$ is at its maximum.

The load or duty assigned to the wind-wheel has been increased exactly in keeping with the increase in power developed at the wheel by reason of its rapidity of rotation. When the wind dies down, the speed of the wheel (and in consequence its power) lessens so that the number of strokes per minute is diminished. The outflow at cock 6 from the tank O becomes greater than the feed to the tank through pipe 5, so that said tank (becoming lighter) is gradually raised through the medium of the counter-weight 9, thus shifting the cross bar $t$ past the sliding block connection with the piston rod $x$, and so far reducing the length of stroke of said rod. The duty at the main pump L has been reduced in keeping with the lessened speed of the wind, so that under a light breeze a much shorter traverse of the piston becomes requisite in effecting the stroke.

Manifestly the improvements are not limited to the mere details of structure set forth, since these may be varied according to the skill of the mechanic, without departing from the spirit of the invention.

Having thus described my invention, what I claim as new, and desire to secure by Letters Patent, is—

1. In wind-mills, the combination with the revolving wheel and with the pump-bar reciprocated thereby, of the piston-rod, the shifting connector secured intermediate said pump-bar and rod and the counter-poise leak-tank sustained from said connector and automatically fed by the variable play of said piston-rod, substantially as described.

2. In wind-mills, the combination with the revolving wheel and with the pump-bar reciprocated thereby of the piston rod, the suspended cross-bar pivotally joined by sliding-block thereto, and the counter-poise leak-tank sustained from said cross-bar, substantially as described.

3. In wind-mills, the combination with the wheel-shaft and its pitman and with the pump-bar, of the piston-rod, the suspended cross-bar pivotally joined by sliding block thereto, the leak-tank and the counter-poise sustained respectively from said cross-bar, and the pump discharging into said leak-tank, substantially as described.

RICHARD UREN.

Witnesses:
JOHN SLOCKETT,
JOHN SLOCKETT, Jr.